US006020417A

United States Patent [19]

Umemoto et al.

[11] Patent Number: 6,020,417

[45] Date of Patent: Feb. 1, 2000

[54] SHEET FEED MEMBERS FOR IMAGE FORMING DEVICES

[75] Inventors: Noboru Umemoto, Inabe-gun; Naonari Tanigawa, Yokkaichi; Tomomi Nakamichi, Yokkaichi; Masaaki Ohashi, Yokkaichi, all of Japan

[73] Assignee: NTN Corporation, Japan

[21] Appl. No.: 09/010,619

[22] Filed: Jan. 22, 1998

[30] Foreign Application Priority Data

| | | | |
|---|---|---|---|
| Jan. 24, 1997 | [JP] | Japan | 9-011367 |
| Mar. 14, 1997 | [JP] | Japan | 9-061137 |

[51] Int. Cl.[7] .......... C08L 27/12

[52] U.S. Cl. .......... 524/546; 428/36.9; 526/250; 526/252

[58] Field of Search .......... 524/544, 545, 524/546; 428/36.9; 526/250, 252

[56] References Cited

U.S. PATENT DOCUMENTS

| | | | |
|---|---|---|---|
| 3,531,432 | 9/1970 | Graver . | |
| 4,257,699 | 3/1981 | Lentz | 355/3 FU |
| 5,480,938 | 1/1996 | Badesha et al. | 525/104 |

FOREIGN PATENT DOCUMENTS

| | | | |
|---|---|---|---|
| 47-6505 | 2/1972 | Japan . | |
| 57-203625 | 12/1982 | Japan . | |
| 60-038452 | 2/1985 | Japan | C08L 27/16 |
| 60-262844 | 12/1985 | Japan | C08L 27/12 |
| 3-2383 | 1/1991 | Japan . | |
| 3-2385 | 1/1991 | Japan . | |
| 5-35183 | 5/1993 | Japan . | |
| 6-68052 | 8/1994 | Japan . | |
| 7-188416 | 7/1995 | Japan . | |
| 9-86687 | 3/1997 | Japan . | |

*Primary Examiner*—Christopher Raimund
*Attorney, Agent, or Firm*—Wenderoth, Lind & Ponack, L.L.P.

[57] ABSTRACT

An object is to provide sheet feed members for use e.g. in a copying machine which make it possible to reduce the size of the copier and increase its operating speed, while satisfying all the other requirements expected for sheet feed members of this type. The sheet feed members are formed from a fluorocarbon resin.

4 Claims, 4 Drawing Sheets

SHEET FEED MEMBERS FOR IMAGE FORMING DEVICES

BACKGROUND OF THE INVENTION

The present invention relates to sheet feed members such as sheet feed rollers and sheet feed guides for feeding sheets from image forming devices such as copiers, facsimiles, laser beam printers (LBP) and other printers after forming images thereon in the image forming device.

Image forming devices that utilize electrophotographic process to form images, such as electrophotographic copiers and laser printers, transfer the images formed on photosensitive material onto transfer paper, fix the transferred images on the paper in an image fixing unit, and discharge the transfer paper.

Toner images transferred onto transfer paper are heat-fused and fixed to the transfer paper by passing the paper through a nip portion of the image fixing unit between an image-fixing roller with a built-in heater and a press roller pressed against the image-fixing roller in the image fixing unit. The paper is then discharged from the image former by paper discharge rollers.

FIG. 1 schematically shows a conventional image fixing unit of this type. It comprises an image-fixing roller 2 with a built-in heater 1 and a press roller 3 pressed against and rotated by the roller 2 with transfer paper sandwiched between the rollers 1 and 2. Transfer paper 5 fed from an unillustrated image transfer unit by a conveyor belt 4 and carrying unfixed toner images is inserted into a nip portion between the fixing roller 2 and the press roller 3 and fed therethrough. While being fed between the rollers 2 and 3, the toner images are fixed to the transfer paper. The paper 5 that has passed between the rollers 2 and 3 is separated from the fixing roller 2 by a stripping finger 7 provided downstream of the fixing roller 2.

The sheet 5 stripped from the fixing roller 2 passes through the feed path guided by sheet feeding slide guides 10, 11, passes between a paper discharge driven roller 9 and a paper discharge idler roller 8, and is discharged from the device while being guided by sheet feeding slide guides 12, 13.

In the case of the color laser printer shown in FIG. 2, transfer paper carrying unfixed toner images passes between an image-fixing roller 16 with a built-in heater and a pressure roller 17, is stripped from the fixing roller 16 by stripping fingers 18, passes between paper discharge rollers 19, 20, between a pair of intermediate guide rollers 21, and then between a drive roller 22 and a kicker roller 23, and is discharged from the device.

Other elements shown in FIG. 2 are a laser unit 30, a toner container 31, an unfixed-toner-image-forming drum 32, an image-transfer device 33, a paper (sheet) cassette 34 and an image-fixing device 35.

FIG. 3–5 show typical sheet feeding rolling elements used in image forming devices, such as paper discharge rollers, intermediate guide rollers and kicking rollers, of which the sheet feeding rolling element shown in FIG. 3 is used as a paper discharge roller or an intermediate roller. This roller has bosses 25 as rotary shafts at both ends of the roller body 24. The rolling element shown in FIG. 4, which is also used for similar purposes, has a shaft hole 26.

The sheet feeding rolling element shown in FIG. 5, which is used as a kicking roller, has geared bosses 28 at both ends of the roller body 27.

High flame resistance and heat resistance, as well as high followability to paper, are required for such sheet feed rollers as well as for paper discharge rollers. In order to meet these requirements, such materials as chloroprene rubber (CR) or polyacetal (POM) are widely used.

High flame resistance and heat resistance are also required for sheet feeding slide guides such as paper discharge guides, as are required for paper discharge rollers. High sliding properties are also required to smoothly pass paper sheets. Conventional slide guides are therefore made from e.g. polyphenylenesulfide (PPS) or polyacetal (POM).

One important requirement for today's copiers, LBP's, facsimiles, etc. is a shorter processing time. In order to shorten the processing time, it is necessary to increase the printing speed and thus the image fixing temperature (to about 250° C.). The ambient temperature at the fixing unit of such a high-speed device is ordinarily 25–150° C., but can reach to 50–250° C.

Also, compactness of such image forming devices, especially copiers, is one of their prime selling points. In order to reduce the size of the entire device, the distance between the image fixing unit and the paper feed members such as feed rollers, feed guides and slide members has to be as short as possible.

But by shortening the treating time, there arose new problems which were not observed in conventional image forming devices, i.e. soiling with toner of sheet feeding parts such as sheet feeding rolling elements and sheet feeding slide guides, and heat deformation thereof.

Further, idler rolling elements having bosses or shaft holes tend to be deformed due to slide wear at their boss portions and shaft holes. Also, the mounting portion of the housing tends to be worn.

In particular, rolling elements with bosses tend to suffer deformation at their bosses due to pressure from other rollers and atmospheric temperature and friction heat during use.

If the slide guides are soiled with toner, images will be soiled or become unclear.

An object of this invention is to solve these problems and to provide sheet feeding parts for use in an image forming device, such as sheet feeding rolling elements or sheet feeding slide guides, which are high in heat resistance and wear resistance and to which toner is less likely to adhere.

SUMMARY OF THE INVENTION

According to this invention, there is provided a sheet feeding part of an image forming device for feeding image-carrying sheets, said rolling element being formed from a fluorocarbon resin.

Also, according to the invention, in a sheet feeding part of an image forming device for feeding image-carrying sheets, said rolling elements being made from a resin composition comprising a fluorocarbon resin to which is added fibrous reinforcing material.

The sheet feeding parts include sheet feeding rolling bodies and sheet feeding sliding guides.

By forming the sheet feeding parts of an image forming device from a fluorocarbon resin, it is possible to form sharp, clear images with no toner stuck thereon. The sheet feeding parts are high in heat resistance and flame resistance.

The sheet feeding parts made from a resin composition comprising a fluorocarbon resin to which is added a fibrous reinforcing material is high in wear resistance and is less likely to be thermally deformed, so that they can be used in high-speed image forming devices.

Other features and objects of the present invention will become apparent from the following description made with reference to the accompanying drawings.

DETAILED DESCRIPTION OF THE PREFERRED EMBODIMENT

Figure 1:
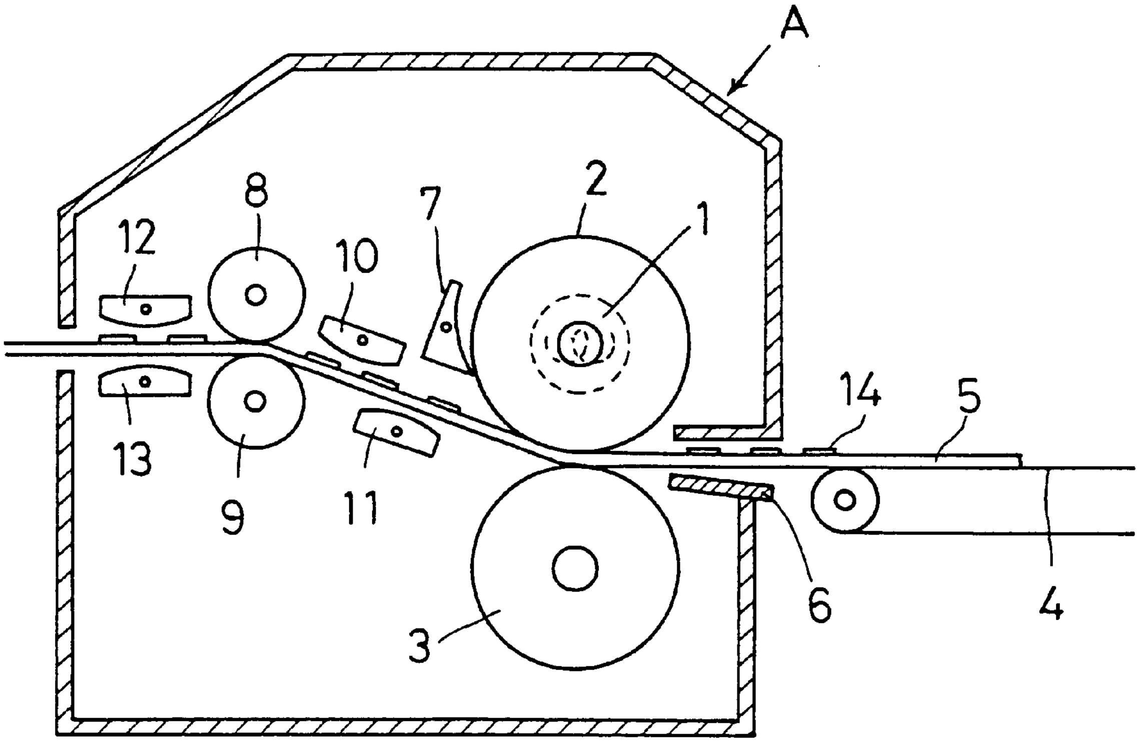
FIG. 1 is a sectional view of a fixing unit with heating rollers.
Figure 2:
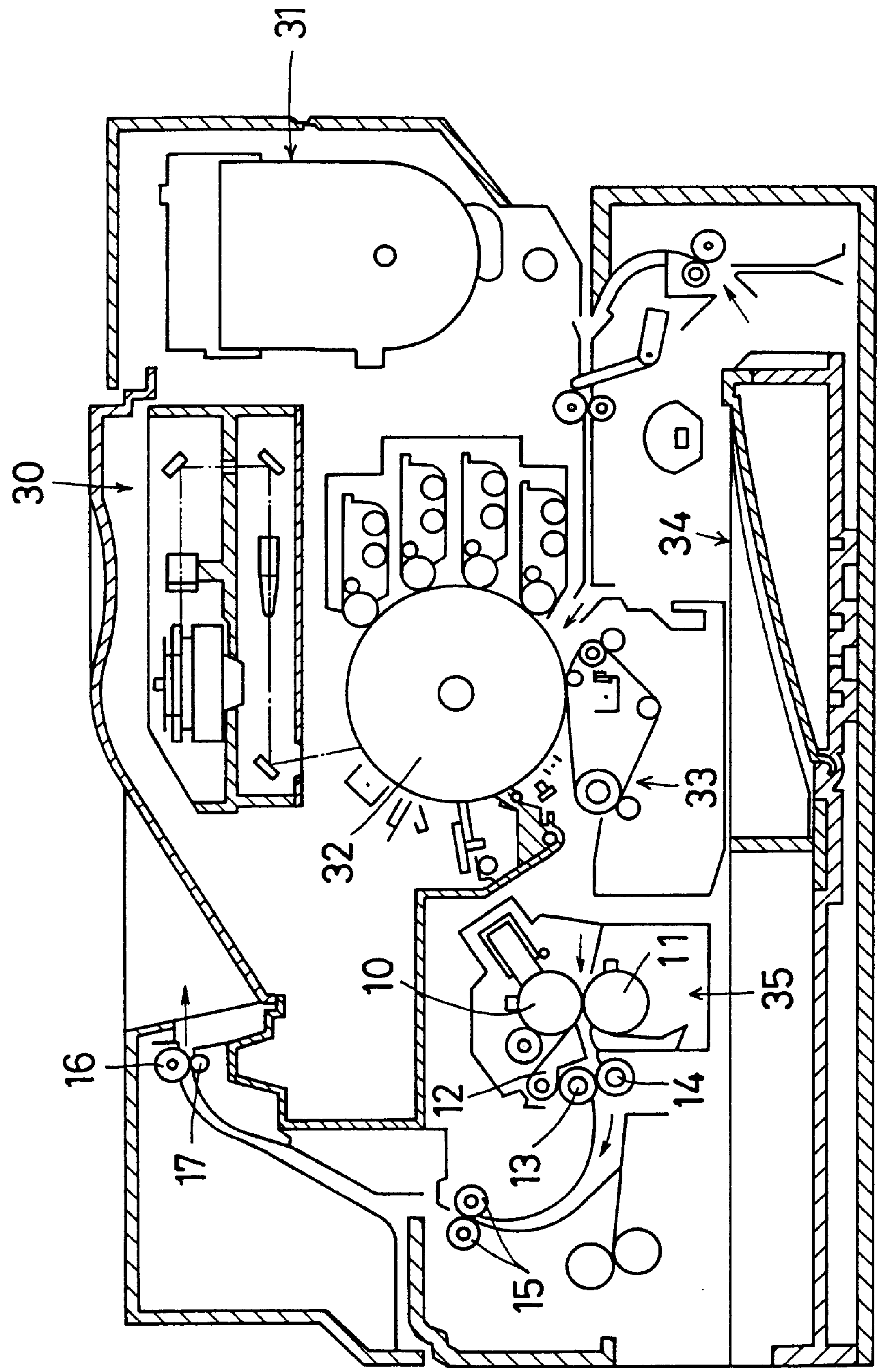
FIG. 2 is a similar view of another example of a fixing unit.
Figure 3:
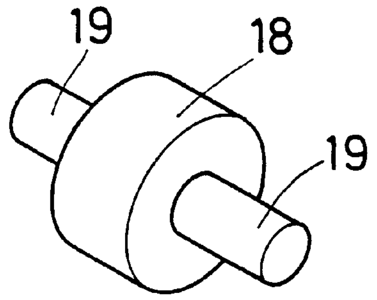
FIG. 3 is a perspective view of a bossed roller.
Figure 4:
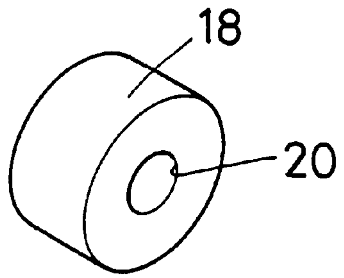
FIG. 4 is a perspective view of a holed roller.
Figure 5:
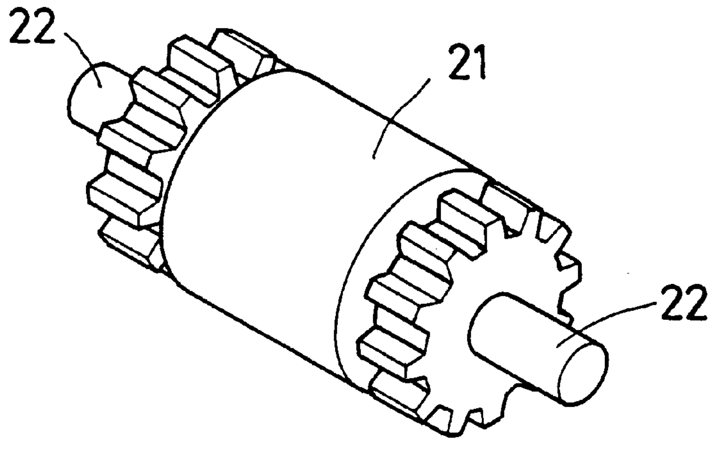
FIG. 5 is a perspective view of a kicker roller.

The paper feed members according to this invention such as paper discharge rollers, intermediate guide rollers, kicker rollers and sheet feeding slide guides are made from a fluorocarbon resin.

The fluorocarbon resin is preferably a molten fluorocarbon resin in view of moldability, more preferably an injection-moldable fluorocarbon resin, most preferably PFA, FEP or ETFE.

Typical fluorocarbon resins are listed below. In the bracket, are indicated the heat deformation temperature (A) (under bending stress of 0.45 MPa (4.6 kgf/cm$^2$), JIS K 7207), melting point (B), heat decomposition temperature (C), melt viscosity (D), number average molecular weight (E), hardness (F) (ASTM D2240, JIS K 7215), critical oxygen index (G)(ASTM D2863), combustibility (H) (UL 94) in this order.

① polytetrafluoroethylene (PTFE), [A: 121° C., B: 327° C., C: about 508–538° C., D: $10^{11}$–$10^{12}$ poise at 340–380° C., E: about $10^6$–$10^7$, F: D50–D65, G: 95 vol % or more, H: v–0]

② tetrafluoroethylene-perfluoroalkylvinylether copolymer (PFA), [A: 74° C., B: 300–310° C., C: 464° C. or more, D: $10^3$–$10^4$ poise at 380° C., E: (2–3)x$10^5$, F: D60–D64, G: 95 vol % or more, H: v–0]

③ tetrafluoroethylene-hexafluoropropylene copolymer (FEP), [A: 72° C., B: 250–282° C., C: 419° C. or more, D: 4x$10^3$–$10^4$ poise at 380° C., E: (3–5)x$10^5$, F: D60–D65, G: 95 vol % or more, H: v–0]

④ tetrafluoroethylene-ethylene copolymer (ETFE), [A: 89–104° C., B: 260–270° C., C: 347° C. or more, D: $10^3$–$10^4$ poise at 300° C., E: 1x$10^5$, F: D75, G: 30 vol %, H: v–0]

⑤ polychlorotrifluoroethylene (PCTFE), [A: 126° C., B: 210–212° C., C: 347–418° C., D: $10^7$ poise at 230° C., E: (1–5)x$10^5$, F: D90, G: 95 vol % or more, H: v–0]

⑥ chlorotrifluoroethylene-ethylene copolymer (ECTFE), [A: 116° C., B: 245° C., C: 330° C. or more, D: 2x$10^3$–$10^5$ poise at 260–315° C., E: (1–5)x$10^5$, F: D55–D75, G: 60 vol %, H: v–0]

⑦ polyvinylidene fluoride (PVDF), [A: 149° C., B: 156–170° C., C: 400–475° C., D: 2x$10^3$–$10^5$ poise at 210–270° C., E: (3–8)x$10^5$, F: D70–D80, G: 44 vol %, H: v–0]

⑧ polyvinyl fluoride (PVF), [B: 195–205° C., C: 372–480° C., E: (2–5)x$10^5$, G: 23 vol %, H: v–0]

⑨ tetrafluoroethylene-hexafluoropropylene-perfluoroalkylvinylether copolymer (EPE), [C: 440° C. or more]

The fluorocarbon resin may be a copolymer of two or more monomers of the abovementioned fluorocarbon resins with the polymerization ratio between the two monomers being about 1:10 to 10:1, or a ternary copolymer such as a fluorinated polyolefin. These resins have properties of solid lubricants. Among these resins, PTFE is especially preferable because it has high heat resistance and chemical resistance, excellent non-tackiness, and low friction coefficient.

These fluorocarbon resins are preferable because they have relatively high derivative thermal decomposition starting temperatures. For example, PTFE and PVDF have thermal decomposition points of about 490° C. and about 350° C., and derivative thermal decomposition starting temperatures of about 555° C. and about 460° C., respectively.

Among fluorocarbon resins there are tetrafluoroethylenic fluorocarbon resins, which include, besides PTFE, the following four resins: tetrafluoroethylene-perfluoro [alkyl (methyl, ethyl, propyl)] vinylether copolymer (PFA), tetrafluoroethylene-hexafluoropropylene copolymer (FEP), tetrafluoroethylene-hexafluoropropylene-perfluoro [olefin (alkyl, propyl)] vinylether ternary copolymer (EPE), ethylene-tetrafluoroethylene alternating copolymer (ETFE). (ETFE may be one which contains the third component. It should have an alternativity of 90–100% for stable physical properties.)

Tetrafluoroethylenic fluorocarbon resins have ($—CF_2–CF_2$)(tetrafluorocarbon group) in the molecular structure. Due to a strong bond between C and F, they show high heat resistance and low friction coefficient. Among them, perfluoro-tetrafluorocarbon resins such as PTFE, PFA and FEP are especially high in heat resistance and low in friction coefficient with excellent lubricating properties, non-tackiness and chemical resistance because the carbon atoms as the substrate are enclosed by fluorine atoms and a minute amount of oxygen atoms. Sheet discharge guide members formed from such resins will be less likely to attract molten toner, dust and other foreign matter, so that their sliding surfaces are less likely to be worn by foreign matter stuck thereon. Also, such rollers will show high heat resistance.

Heat resistance can be evaluated by e.g. thermal deformation temperature (JIS K 7207). A fluorocarbon resin having a thermal deformation temperature (at a bending stress of 0.45 MPa (4.6 kgf/cm$^2$) under JIS K 7207) of 50° C. or higher, 70–250° C. in particular, is preferable because such resin is less likely to be thermally deformed. This test should be conducted at a low bending stress of e.g. 0.45 MPa (4.6 kgf/cm$^2$) because the paper feed rolling member of the present application is used under very low load.

The fluorocarbon resin used in this invention is highly heat-resistant. Considering the bonding energy between fluorine and carbon atoms, the upper limit of its crystalline melting point, which shows the physical properties at 250° C. or higher, will presumably not exceed 400° C.

Preferably, such fluorocarbon has a thermal decomposition temperature of 300° C. or higher, 400–550° C. in particular. Such thermal decomposition temperature can be measured by gravimetric analysis. More particularly, it can be calculated from a thermobalance weight loss curve (TG) and a thermogram (DTA) such as a thermobalance method by thermal analysis (such as DSC, differential scanning calorimetry, DTA or TDA). For example, it may be given as the temperature at which a 15 mg test piece has lost weight by 50% due to thermal decomposition, which is obtained by heating the test piece at the heating rate of 10° C./min in air or nitrogen gas, measuring the temperature at which the test pieces loses weight by 5% or by 5 mg, or measuring the weight loss percentage at each of predetermined temperatures, and estimating the temperature at which the test piece loses weight by 50%. Otherwise, it may be given as the derivative thermal decomposition starting temperature.

Further, it is preferable to use a fluorocarbon resin that shows a melt viscosity of $10^3$–$10^5$ poise at a shear rate of $10^2$–$10^4$ ($sec^{-1}$), as measured under JIS K 7210, because such a resin have excellent injection moldability. The melt viscosity of fluorocarbon resin is more preferably $10^3$–$10^4$ poise.

Among such resins, PFA and FEP show melt viscosities of $10^3$–$10^4$ poise and $4\times10^3$–$10^4$ poise at 380° C., respectively, and ETFE shows $10^3$–$10^4$ poise at 300° C. and PTFE shows $10^{11}$–$10^{12}$ poise at 340–380° C. These resins are especially preferable, because resins having high viscosities ranging from $10^3$–$10^{12}$ at such high temperatures must be highly heat-resistant.

But if the melt viscosity at 280–380° C. is higher than $10^7$ poise, cylinders of a melt molder will be put under a heavy load during pelletizing and injection molding, making it difficult to carry out pelletizing and injection molding in a stable manner and worsening the dimensional accuracy. Thus, taking into consideration the heat resistance, moldability and mass-productivity, it is preferable to use a resin having a melt viscosity of $10^3$–$10^6$ poise at 280–380° C.

PFA's are chain fluororesins having perfluoroalkoxy side chains, including a modified resin of PTFE, that is a homopolymer, and a monomer containing perfluoroalkoxy groups, and a copolymer containing PTFE and a comonomer that forms perfluoroalkoxy side chains.

The melt viscosity of PFA, FEP and ETFE is evaluated under ASTM D3307 in specific melt viscosity at 370–380° C., particularly 372±1° C. for PFA and FEP, and at 290–300° C. for ETFE,. These injection-moldable fluorocarbon resins should have a specific melt viscosity of $1\times10^3$–$1\times10^6$ poise.

Further, such a resin should have a melt flow index of 1–36 g/10 min, more preferably 1–18 g/10 min, most preferably 3–18 g/10 min. (ASTM D3370) for high injection moldability and heat resistance.

The alkyl group that PFA and FEP may have 1–10 or 1–4 carbon atoms, and may be in the form of methyl, ethyl, propyl or butyl groups, etc. Each alkyl group portion should have at least one of the abovementioned groups. The weight percentage of one or each group in the resin should be 0.1–10% by weight, preferably 1–8% by weight, and most preferably 3–6% by weight. In order for PFA and FEP to reveal optimum melt viscosity, the content of the hexafluoropropylene portion should be 8–16%, preferably 8–10% by weight. Such a resin is high in moldability. Paper feed rolling members formed from such resin will show high heat resistance.

For higher heat resistance, non-tackiness and melt viscosity, the alkyl group that PFA and FEP have is preferably propyl group.

When compared with relatively flexible resins such as PTFE, PFA and FEP, hydrogen-containing fluorocarbon resins such as ETFE, PCTFE and PVDF are high in mechanical strength and wear resistance, and are thus preferable. Among them, ETFE is particularly preferable because it is high in heat resistance with its glass transition point at about 100° C. or over and also high in shock resistance, so that no breakage will occur in a notched Izod impact test. This means that end products, i.e. moldings are less likely to suffer undue cracks. Since ETFE has such favorable properties, it can minimize possible deterioration in shock resistance of an end product due to a fibrous reinforcing material which is added to the resin composition in order to increase the thermal deformation temperature, bending modulus and wear resistance.

The composition ratio of tetrafluoroethylene to its ethylene in ETFE should be 70:30 to 30:70, preferably 40:60 to 60:40. The crystalline melting point of ETFE becomes maximum where its tetrafluoroethylene content is near 50 mol %. Thus, for higher heat resistance, the above composition ratio should be between 45:55 and 55:45. Such a polymer may further contain a third element in a small amount.

If powdered PTFE is added to a hydrogen-containing fluorocarbon other than PTFE, such as ETFE, resin powder of perfluorotetrafluorocarbon such as PTFE and PFA having a particle diameter of 1–50 μm is preferable for uniformity of the composition. If it is desired to improve the mechanical properties of the sheet feeding rolling elements, fibrous PTFE powder (virgin PTFE powder) should be used.

According to this invention, better results are achievable if recycled PTFE is used instead of virgin PTFE. Recycled PTFE powder is obtained by calcining and then pulverizing virgin PTFE. It is less likely to turn fibrous, which means that the melt viscosity of a resin composition is kept from rising so markedly as when virgin PTFE powder is added to a resin composition. Injection moldablility is thus not impaired. Since recycled PTFE powder is calcined, a product made from a resin composition in which is mixed recycled PTFE is less likely to suffer dimensional and shape variations or cracks.

Commercially available recycled PTFE powder include KT300M, KT300H, KT400M, KT400H and KTL610 made by KITAMURA Co., Ltd.

If a perfluoro-series tetrafluoroethylene such as PTFE powder, recycled PTFE powder, PFA powder or FEP powder is added to a fluorocarbon resin, the main component, to improve non-tackiness and thus to minimize damage to the mating slide member, it should be added in the ratio of 1–25 wt %, preferably 2–20 wt %, more preferably 5–15 wt %, with respect to entire resin composition. If its content is below the above range, the sliding properties of the sheet feeding rolling elements will not improve. If over this range, moldability will deteriorate.

Preferably, the fluorocarbon resin has a number-average molecular weight (Mn) of $1\times10^4$ to $1\times10^8$. If this value is below the above range, the wear resistance will be insufficient. If higher than this range, injection molding will become difficult, thus making molding less efficient. Thus, this value is more preferably $1\times10^5$ to $1\times10^7$. If injection moldability is important, it should be $1\times10^5$ to $1\times10^6$.

The surface shape and surface roughness should be as small as possible, at the roller cavity of the mold for injection-molding the roller, and the support shaft of the sheet discharge roller, e.g. at the portion of the roller where it is brought into rolling sliding contact with sheet members or the support shaft, at the portion of the inner periphery of the roller where it comes into rolling sliding contact with the outer periphery of the support shaft, and/or at the annular outer periphery of the roller where it comes into sliding contact with sheet members such as paper sheets, and also at the inner and outer peripheries of the annular portion of the roller to improve the release properties of the roller with respect to the mold.

Such surface shapes, surface roughnesses, shape roughnesses may be given in JIS-defined parameters such as Rmax (maximum roughness), Ra (arithmetic mean roughness) or Rz (ten-point mean roughness). They should be 25 μm or less, preferably 10 μm or less, more preferably 3.2 μm or less. If the surface roughness is over this value, sliding surfaces might be damaged and thus worn. Also, it becomes difficult to release sheet efficiency and yield.

In order to cut the cavity surface of the mold for injection molding, the support shaft, and the paper discharge roller surface with high accuracy, the surface shape and roughness should be 0.1 μm or higher, preferably 1 μm or higher.

But considering the fact that it takes a long time to finish the surface of the mold for injection molding or the support shaft and possible influence on the formation of transfer resin film, the surface shape/roughness may be 2–8 μm, provided the roller is not affected by wear.

For the hardness of the paper discharge guide member, it should have a Shore hardness (measured by a durometer under ASTM D2240 (JIS K 7215)) of D40–D90, preferably D50–D80. If the hardness is too low, the guide member may be worn by coming into sliding contact with OHP transfer members or transfer paper. If too high, the guide member tends to damage PPC paper and other OHP transfer members. The hardness of the guide member is adjustable to the above-described range by adding 1–50 weight % of various organic and inorganic fillers.

It is possible to determine the non-tackiness on the surface of resin moldings such as paper discharge rolls having paper discharge guide members and paper discharge slide guides by measuring the contact angle of waterdrops. If such contact angle is 80° or over, one can safely say that the resin molding is sufficiently non-tacky. Preferably, the contact angle is 90° or over.

Typically, the contact angle is determined by dropping 0.01–0.1 milliliter, preferably 0.05 milliliter, waterdrops on the surface of a test pieces at normal temperature and pressure and measuring their contact angle 30 seconds and one minute after the beginning of dropping by a goniometer made by ERMA OPTICS CO., LTD. But the contact angle may be measured in any other way.

The fibrous reinforcing material used in this invention has preferably fiber diameters of 0.05–8 μm and fiber lengths of 1–100 μm, more preferably fiber diameters of 0.1–3 μm and fiber lengths of 1–40 μm. A reinforcing material having fiber diameters or lengths below the above range could hardly improve the wear resistance of the PPS resin composition and thus reinforce the composition. A reinforcing material having fiber diameters or lengths over the above range would increase the surface roughness, making it difficult to form an angular end with high precision.

The fibrous reinforcing material used in this invention includes potassium titanate whisker, aluminum borate whisker, magnesium borate whisker, zinc oxide whisker, titanium oxide whisker, calcium carbide whisker, aluminum sulfate whisker, calcium sulfate whisker, magnesium sulfate whisker, calcium silicate whisker, wollastonite whisker, whiskers containing carbon fiber, glass fiber, graphite fiber or silicon oxide; various kinds of mineral whiskers, mineral whiskers produced by melting, working and purifying igneous rocks; ceramic whiskers such as silicon nitride whisker, silicon carbide whiskers and alumina whisker.

If the fibrous reinforcing material used in this invention is potassium titanate whiskers, such whiskers may be ones represented by $K_2O.nTiO_2$ (n is a positive integer or a positive even number) such as $K_2O.6TiO_2$, $K_2O.6TiO_2.\frac{1}{2}H_2O$, $K_2Ti_2O_5$, $K_2Ti_4O_9$, $K_2Ti_6O_{13}$ and $K_2Ti_8O_{17}$. Such whiskers have a specific gravity of 3.2–3.3, a melting point of 1300–1400° C., and a Mohs hardness of 3.5–4, and are manufactured by the flux or melt method.

In the flux method, a mixture of raw materials ($TiO_2$ and $K_2CO_3$) and a flux are melted at 1150° C., and cooled gradually to synthesize $K_2Ti_4O_9$ whiskers (primary compound). The whiskers obtained are treated in a dilute acid solution or boiling water to modify their composition by extracting part of K between layers. The thus modified whiskers are heat-treated at about 1000° C. to synthesize $K_2Ti_6O_{13}$ whiskers having a tunnel structure (secondary compound). The whiskers thus formed may be 0.1–0.5 μm in diameter and 1–50 μm long. Commercially available such whiskers include TISMO N, TISMO L and TISMO D made by OTSUKA CHEMICAL CO., LTD.

In the melt method, raw materials are mixed with $K_2Ti_2O_5$ in a stoichiometric composition ratio, and the mixture is melted at 1100–1200° C., and the molten mixture is quickly cooled to synthesize a needle-like $K_2Ti_2O_5$ as primary compound. The whiskers obtained are treated to modify their composition and structure in the same manner as $K_2Ti_4O_9$ whiskers to synthesize $K_2Ti_6O_{13}$ whiskers (secondary compound). Whiskers formed by the melt method are larger in diameter than whiskers manufactured by the flux method. That is, such whiskers are typically 10–30 μm diameter and 80–500 μm long. Commercially available such whiskers include TXAS A, TXAS FA and TXAS B made by KUBOTA LTD.

Aluminum borate whiskers are white needle-like crystals represented by $9Al_2O_3.2B_2O_3$ or $2Al_2O_3.B_2O_3$, and may be whitened by adding sulfur. Such aluminum borate whiskers have an average fiber diameter of 0.05–5 μm and an average fiber length of 1–100 μm.

Aluminum borate whiskers represented by $9Al_2O_3.2B_2O_3$ have a true specific gravity of 2.93–2.95, and a melting point of 1400–1500° C. Such whiskers are manufactured by heating at least one of aluminum hydroxides and aluminum inorganic salts and at least one of oxides, oxyacids and alkali metal salts of boron to 900–1200° C. in the presence of a melting agent comprising at least one of sulfates, chlorides and carbonates of alkali metals, thereby reacting and growing them.

Aluminum borate whiskers represented by $2Al_2O_3.B_2O_3$ have a true specific gravity of 2.92–2.94, and a melting point of 1000–1100° C. Such whiskers are manufactured by heating the same materials and melting agent used to manufacture $9Al_2O_3.B_2O_3$ to 600–1000° C. to react and grow them.

In order to improve the reinforcing effect of such whiskers as aluminum borate, surface treatment with a coupling agent may be carried out. The coupling agent used may be silicone, titanium, aluminium, zirconium, zircoaluminium, chrome, boron, phosphate, or amino acid series.

Preferable commercially available such aluminum borate whiskers include ALBOREX Y and ALBOREX G made by SHIKOKU CHEMICALS Corp. Such whiskers have an average fiber diameter of 0.5–1 μm, and an average fiber length of 1–30 μm.

Other whiskers that can be used in this invention include tetrapod-shaped zinc oxide whiskers (ZnO) that, containing impurities such as Pb or Cd, are yellow or gray in color, whiskers similar to the above whiskers but broken into conical or tapered shape, titanium oxide whiskers represented by $TiO_2$ in the form of rutile, white, needle-like crystals, and calcium carbonate whiskers.

Ordinary whiskers have an average diameter of 0.01 to 10 μm. In this invention, the average diameter should preferably be 0.05 to 8 μm. Also, ordinary whiskers have an average length of 1 μm, 1 to 300 μm on the average. Some whiskers have such a length as long as 50–60 mm (with an aspect ratio of 1 to 200). In this invention, the fiber length should be 1 to 100 μm.

The use of abovementioned whiskers as fibrous reinforcing material makes it possible to provide sheet feed members which are accurate in size and reinforced and are less liable to form burrs.

In order to prevent the stripping finger according to this invention from damaging the sliding mating member, it is preferable to use a fibrous reinforcing material having a Mohs hardness of 1–10, preferably 3–9. If the Mohs hardness of the fibrous reinforcing material is below this range, it will be impossible to sufficiently reinforce the resin composition. If too high, the possibility of damaging the mating sliding member increases.

There are two Mohs hardness standards, a new and an old one. The Mohs hardness values shown in the specification of this invention are all given under the old standard. Any fibrous reinforcing materials having a Mohs hardness higher than 5 is judged to be a hard material, and one having a Mohs hardness of less than 5 are regarded as a soft material.

Whiskers having a hardness within the above range include potassium titanate whiskers, calcium carbonate whiskers, wollastonite whiskers, magnesium sulfate whiskers, and aluminum borate whiskers. Among them, potassium tatanium whiskers and aluminum borate whiskers are especially preferable in fiber shape and mechanical strength.

Whiskers in the resin composition are broken during pelletizing or molding, so that their average length decreases to less than 10 $\mu$m. According to the type of whiskers, their length can decrease to 1–5 $\mu$m. Such short whiskers will not impair smooth flow of resin during injection molding. This makes it possible to make the surface of the stripping finger extremely smooth, improve non-tackiness and dimensional accuracy, and prevent the formation of burrs at the tip and corners of the finger during molding.

The content of the fibrous reinforcing material in the resin composition is 0–35 wt %, preferably 2–25 wt % of fluorocarbon resin. If the content is more than 35 wt %, non-tackiness of fluorocarbon resin to toner would be impaired.

Description is now made of the UL combustibilty rating of the fluorocarbon resin, which is determined by its physical properties.

UL94 stipulates two combustibility tests, i.e. a horizontal firing test 94HB and a vertical firing test 94V. For incombustible materials, test 94V usually applies.

Description is now made of the limit oxygen content (ASTM D2863, JIS K7201), as represented by the physical properties of the fluorocarbon resin.

PTFE, PFA, FEP and PCTFE have limit oxygen contents of 95 volume % or over, and are noncombustible. ETFE has a limit oxygen content of 30 volume %, and shows self-extinguishing properties, though inferior to PFA and FEP, if it has a limit oxygen content of 27–100 volume %. Thus, depending upon the specifications and other conditions concerning combustiblity, this resin may be used. But if higher safety against combustibility is required, a resin having a limit oxygen content of at least 50 volume %, preferably 80–100 volume %, should be used.

Figure 6A:
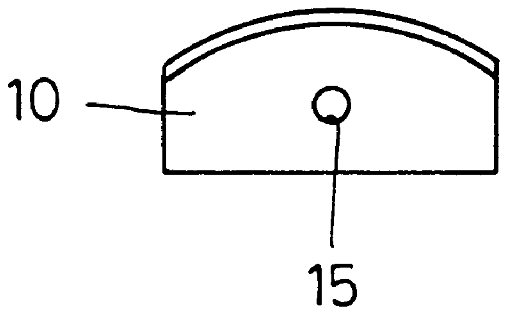
FIG. 6A is a front view of a sheet feeding slide guide.
Figure 6B:
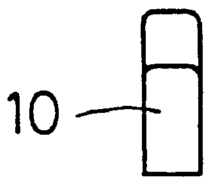
FIG. 6B is a side view of the same.

The sheet feed slide guides for an image forming device may be in the form of a rectangular plate having and arcuate edge as shown in FIGS. 1 and 6. It may be in the form of a globe, elliptical globe, column, circular plate or elliptical plate having a circular surface to guide the plane of sheets. It may also be formed with a step or groove to guide the edge of sheets.

The slide guide shown in FIG. 6 has only its facial layer (to be contacted with the sheet) made of a resin composition containing fluorocarbon resin as main component and other portions made of resin or metal. The slide guide may be integrally molded of a resin composition containing fluorocarbon resin as a main component, including the facial layer to be contacted with the sheet. A plurality of slide guides may be molded into a single body.

The numeral 15 in FIG. 6 denotes a mounting hole in which the sheet member is mounted on the image forming device so as to be pivotable or not pivotable.

Resin molded paper discharge guide members such as paper discharge rollers or paper discharge slide guides should have a volume not exceeding 30000 $mm^3$. Resin molded articles having a greater volume will be so large in "sinkmarks" that it is difficult to maintain high dimensional accuracy. If too small in volume, molding will be difficult. Thus, the molded article preferably has a volume of 10–10000 $mm^3$, more preferably 50–5000 $mm^3$.

The sheet discharge rollers and guides according to this invention can also be used for various types of printers in which record patterns are formed on recording media such as photosensitive materials by using external electric signals, and the patterns formed are converted to visible patterns. Such printers include electrophotographic printers, ink-jet printers, thermosensitive printers, photoprinters and electronic recording printers.

Electrophotographic printing methods include Carlson method, light-charge injection method, light polarizing method, photoelectromotive force method, charge-transfer method, electrolytic electrophotographic method, electrostatic latent image photographic method, light-electrophoresis method, and thermoplastic method. Photoprinters include laser printers, LED (light emitting diode) printers, liquid crystal shutter printers and CRT printers. Electronic recording methods include electrostatic recording type, electric recording type, electrolytic recording type and discharge recording type. Also, direct or indirect process may be used. The static recording method may be either a wet method in which oil is applied or a dry method.

Specifically, the sheet discharge guide members according to this invention can be used for every kind of image forming devices including dry or wet type static copiers for transferring toner images, laser beam printers (LBP), liquid crystal shutter (LCD) printers, facsimile printers, plain paper copiers (PPC), light emitting diode (LED) printers, silver-salt photographic printers (CRT), and other printers.

The sheet discharge rollers and guides according to this invention may be used in the paper discharge unit of the exposure unit, developing unit, and image fixing unit, or any other part of an image forming device. But the paper discharge rollers and guides according to the invention, formed from a fluorocarbon resin of the abovementioned type and having excellent heat resistance, will exhibit its properties best when used in the image fixing unit rather than in the exposure unit or the developing unit.

[Examples]

The raw materials used in the Examples and comparative Examples are listed below. In the bracket, are indicated the heat deformation temperature (A) (under bending stress of 0.45 MPa (4.6 $kgf/cm^2$), JIS K 7207), melting point (B), heat decomposition temperature (C), melt viscosity (D), number average molecular weight (E), hardness (F) (ASTM D2240, JIS K 7215), critical oxygen index (G)(ASTM D2863), combustibility (H) (UL 94) in this order.

① polytetrafluoroethylene (PTFE-1) made by DuPont, [A: 121° C., B: 327° C., C: about 508–538° C., D: $10^{11}$–$10^{12}$ poise at 340–380° C., E: about $10^6$–$10^7$, F: D50–D65, G: 95 vol % or more, H: v–0]

② recycled polytetrafluoroethylene (PTFE-2) KTL 610 made by KITAMURA CO., LTD.

③ tetrafluoroethylene-perfluoroalkylvinylether copolymer (PFA) AFLON made by ASAHI GLASS CO., LTD., [A: 74° C., B: 300–310° C., C: 464° C. or more, D: $10^3$–$10^4$ poise at 380° C., E: (2–3)x$10^5$, F: D60–D64, G: 95 vol % or more, H: v–0]

④ tetrafluoroethylene-hexafluoropropylene copolymer (FEP) AFLON FEP made by ASAHI GLASS CO., LTD, [A: 72° C., B: 250–282°0 C., C: 419° C. or more, D: 4x$10^3$–$10^4$ poise at 380° C., E: (3–5)x$10^5$, F: D60–D65, G: 95 vol % or more, H: v–0]

⑤ tetrafluoroethylene-ethylene copolymer (ETFE) AFLON COP made by ASAHI GLASS CO., LTD, [A: 89–104° C., B: 260–270° C., C: 347° C. or more, D: $10^3$–$10^4$ poise at 300° C., E: 1x$10^5$, F: D75, G: 30 vol %, H: v–0]

⑥ aluminum borate whiskers (WHISKER-1) ALBOLEX Y made by SHIKOKU CHEMICALS Corp [fiber diameter: 0.5–1 μm, Morse hardness: 7]

⑦ potassium titanate whiskers (WHISKER-2) TISMO-N made by OTSUKA CHEMICAL CO., LTD [fiber diameter: 0.1–0.3 μm, fiber length: 20–30 μm, Morse hardness: 4]

⑧-A chloroprene rubber (CR) DENTA Chloroprene made by DENKI KAGAKU KOGYO KABUSHIKI KAISHA ⑨ polyacetal (POM) Duracon AW-01 made by POLYPLASTICS CO., LTD.

[Examples A1–A8 and Controls A1,A2]

In Example A1, the raw materials were mixed together in a dry state, compression-molded and formed into paper discharge rollers (as an example of sheet feed rolling members) 9 mm in outer diameter, 7 mm in inner diameter and 13.5 mm wide.

In Examples A2–A4 and Control A2, the raw materials were mixed together in molten state and pelletized and the pellets were injection-molded in an injection molder under conditions that are most suitable for the respective resins, and molded into 9 mm diax7 mm diax13.5 mm paper discharge rollers (volume: 340 $mm^3$). In Comparative Example A1, paper discharge rollers of the above size was formed by cutting a round rod of chloroprene rubber. Their physical properties were measured in the following manner. The results of measurement are shown in Table 1.

The tests were conducted in the following manners:

(1) Actual machine test

Fifty thousand copying sheets, size A-4, were continuously fed into a dry type electrostatic copying machine on which the paper discharge rollers are mounted, and the copied sheets were processed continuously. The specimens were then removed from the copier and their surface was observed.

(a) Adherence of toner

Marks ○ in the table indicate that no toner was found stuck on the specimen, marks X indicate that toner was observed thereon.

(b) Heat resistance

Marks ○ indicate that the specimens were not deformed, and marks X indicate that they were deformed.

(c) Wear resistance test

○ indicates that no wear were observed on the specimen. X indicates that wear was observed.

(2) Physical property test (d) Non-tackiness

Contact angles by water were measured with a goniometer type contact angle meter made by ERMA OPTICS CO LTD. Marks ○ are given to specimens whose contact angles were 90° or greater, and marks X are given to specimens whose contact angles were smaller than 90°.

(e) Moldability

Mass-productivity of the specimens were evaluated. Injection-moldable specimens were indicated by ○, those that are not injection-moldable but need no post-machining are indicated by Δ, those that are not injection-moldable and need post-machining are indicated by X.

(f) Flame retardance

Measured under UL94 of the UL standard.

(g) Wear resistance test

On a thrust type wear tester, cylindrical test specimens 17 mm inner diameter x21 mm outer diameter and 10 mm long were tested under the following conditions to determine the amount of wear (in mg).

Temperature: 150° C.

Load: 5N (0.5 kgf)

Speed: 200 rpm

Mating material: Stainless SUS 304

Lubrication: None

As will be apparent from Table 1, Examples A2–A4 showed good moldability and excellent heat resistance, flame resistance and wear resistance, and no toner was found stuck on the surface. This indicate that, by using the rollers of the Examples, sharp and clear images are obtainable.

Also, the rollers of the Examples A2–A4, formed by injection-molding PFA, FEP or ETFE, are low in cost, can be formed by injection molding into complicated shapes, and high in mass-productivity.

In contrast, toner was found stuck on the rollers of the Comparative Examples A1 and A2. Their heat resistance and tackiness to toner were inferior.

Next, Examples B1–B8 and Comparative Examples B1 and B2 for sheet feed slide guides were prepared by use of the same materials as described above except that (8 -B) was used instead of (8-A), (8-B) Polyphenilenesulfide (PPS) GS 40 made by TOSOH SUSTEEL Co., Ltd.

[Examples B1–B8 and Comparative Examples B1 and B2]

In Example B1, the raw materials shown in Table 2 were mixed together in a dry state, compression-molded into preforms, which were removed from molds, sintered and formed by machining into sheet feed slide guide of a shape as shown in FIG. 6.

In Examples B2–B8 and Comparative Examples B1 and B2, the raw materials were mixed together in a molten state at the ratio shown in Table 2 and pelletized and the pellets were injection-molded in an injection molder under conditions that are most suitable for the respective resins, and molded into sheet feed slide guides as shown in FIG. 6. Their physical properties were measured in the manner mentioned above except for the following points. In the Actual machine test, eight slide guides were mounted with equal spacings at a point where the use condition was the most severe (at point 10 in FIG. 1 where temperature was high and non-tackiness to toner was required to a highest degree) of a dry type electrostatic copy and thirty thousand sheets, size A-4, were continuously fed through the machine for copying. The specimens were examined per ten thousand sheets.

As for the image state (d), the copied sheets were checked per 10000 sheets. Mark ○ shows clear and X does unclear. The results of measurement are shown in Table 2.

As will be apparent from Table 2, Examples B2–B8 showed good moldability and excellent heat resistance, flame resistance and wear resistance, and no toner was found stuck on the surface. This indicates that, by using the slide guides of the Examples, sharp and clear images are obtainable.

Also, the slide guides of the Examples B2–B4, formed by injection-molding PFA, FEP or ETFE, are low in cost, can be formed by injection molding into complicated shapes, and high in mass-productivity.

In contrast, toner was found stuck on the slide guides of the Comparative Examples B1 and B2. Their heat resistance and tackiness to toner were inferior.

TABLE 1

| | Examples | | | | | | | | Comparative Examples | |
|---|---|---|---|---|---|---|---|---|---|---|
| | $A_1$ | $A_2$ | $A_3$ | $A_4$ | $A_5$ | $A_6$ | $A_7$ | $A_8$ | $A_1$ | $A_2$ |
| Contents (wt %) | | | | | | | | | | |
| PTFE-1 (1) | 100 | — | — | — | — | — | — | — | — | — |
| PTFE-2 (2) | — | — | — | — | — | — | 10 | 10 | — | — |
| PFA (3) | — | 100 | — | — | 90 | — | — | 5 | — | — |
| FEP (4) | — | — | 100 | — | — | — | — | — | — | — |
| ETFE (5) | — | — | — | 100 | — | 90 | 75 | 85 | — | — |
| WISKER-1 (6) | — | — | — | — | 10 | — | 15 | — | — | — |
| WISKER-2 (7) | — | — | — | — | — | 10 | — | — | — | — |
| CR (8-A) | — | — | — | — | — | — | — | — | 100 | — |
| POM (9) | — | — | — | — | — | — | — | — | — | 100 |
| Machine test | | | | | | | | | | |
| (a) Toner adherence | ○ | ○ | ○ | ○ | ○ | ○ | ○ | ○ | X | X |
| (b) Heat resistance | ○ | ○ | ○ | ○ | ○ | ○ | ○ | ○ | X | X |
| (c) Wear resistance | ○ | ○ | ○ | ○ | ○ | ○ | ○ | ○ | X | ○ |
| Physical property test | | | | | | | | | | |
| (d) Non-tackiness | ○ | ○ | ○ | ○ | ○ | ○ | ○ | ○ | X | X |
| (e) Moldability | X | ○ | ○ | ○ | ○ | ○ | ○ | ○ | Δ | ○ |
| (f) Flame retardance | V-0 | V-0 | V-0 | V-0 | V-0* | V-0* | V-0* | V-0* | V-0* | HB |
| (g) Amount of wear (mg) | 8.4 | 1.5 | 2.1 | 2.4 | 1 | 1.6 | 0.8 | 1.9 | 14.6 | 3.5 |

*Equivalent

TABLE 2

| | Examples | | | | | | | | Comparative Examples | |
|---|---|---|---|---|---|---|---|---|---|---|
| | $B_1$ | $B_2$ | $B_3$ | $B_4$ | $B_5$ | $B_6$ | $B_7$ | $B_8$ | $B_1$ | $B_2$ |
| Contents (wt %) | | | | | | | | | | |
| PTFE-1 (1) | 100 | — | — | — | — | — | — | — | — | — |
| PTFE-2 (2) | — | — | — | — | — | — | 10 | 10 | — | — |
| PFA (3) | — | 100 | — | — | 90 | — | — | 5 | — | — |
| FEP (4) | — | — | 100 | — | — | — | — | — | — | — |
| ETFE (5) | — | — | — | 100 | — | 90 | 75 | 85 | — | — |
| WISKER-1 (6) | — | — | — | — | 10 | — | 15 | — | — | — |
| WISKER-2 (7) | — | — | — | — | — | 10 | — | — | — | — |
| PPS (8-B) | — | — | — | — | — | — | — | — | 100 | — |
| POM (9) | — | — | — | — | — | — | — | — | — | 100 |
| Machine test | | | | | | | | | | |
| (a) Toner adherence | ○ | ○ | ○ | ○ | ○ | ○ | ○ | ○ | X | X |
| (b) Heat resistance | ○ | ○ | ○ | ○ | ○ | ○ | ○ | ○ | ○ | X |
| (c) Wear resistance | ○ | ○ | ○ | ○ | ○ | ○ | ○ | ○ | ○ | ○ |
| Image state | | | | | | | | | | |
| Ten thousand | ○ | ○ | ○ | ○ | ○ | ○ | ○ | ○ | ○ | X |
| Twenty thousand | ○ | ○ | ○ | ○ | ○ | ○ | ○ | ○ | X | X |
| Thirty thousand | ○ | ○ | ○ | ○ | ○ | ○ | ○ | ○ | X | X |
| Physical property test | | | | | | | | | | |
| (e) Non-tackiness | ○ | ○ | ○ | ○ | ○ | ○ | ○ | ○ | X | X |
| (f) Moldability | X | ○ | ○ | ○ | ○ | ○ | ○ | ○ | Δ | ○ |
| (f) Flame retardance | V-0 | V-0 | V-0 | V-0 | V-0* | V-0* | V-0* | V-0* | V-0* | HB |
| (g) Amount of wear (mg) | 8.4 | 1.5 | 2.1 | 2.4 | 1 | 1.6 | 0.8 | 1.9 | 2.5 | 3.5 |

*Equivalent

What is claimed is:

1. A sheet feed roller for use in an image forming device for feeding sheets, said roller being provided downstream of image-fusing rollers for forming images on said sheets by fusing toner thereon, said sheet feed roller comprising a roller body having boss portions at both ends thereof or formed with a bore through which a shaft is to be inserted, said roller being entirely injection-molded from at least one material selected from the group consisting of tetrafluoroethylene-perfluoroalkylvinylether copolymers, tetrafluoroethylene-hexafluoropropylene copolymers, and tetrafluoroethylene-ethylene copolymers, said material having a crystalline melting point of 250° C. or higher, and a melt viscosity of $1\times10^3$ to $1\times10^6$ poise at 280–380° C.

2. The roller as claimed in claim 1, wherein said roller is injection-molded from a mixture of said material and a fibrous reinforcing material having a fiber diameter of 0.05 to 8 $\mu$m and a fiber length of 1 to 100 $\mu$m.

3. A guide for use in an image forming device for feeding sheets, said guide being provided downstream of image-fusing rollers for forming images on said sheets by fusing toner thereon, said guide being entirely injection-molded from at least one material selected from the group consisting of tetrafluoroethylene-perfluoroalkylvinylether copolymers, tetrafluoroethylene-hexafluoropropylene copolymers, and tetrafluoroethylene-ethylene copolymers, said material having a crystalline melting point of 250° C. or higher, and a melt viscosity of $1\times10^3$ to $1\times10^6$ poise at 280–380° C.

4. The guide as claimed in claim 3, which is injection-molded from a mixture of said material and a fibrous reinforcing material having a fiber diameter of 0.05 to 8 $\mu$m and a fiber length of 1 to 100 $\mu$m.

* * * * *